(No Model.)
F. BAUER.
STUFFING BOX.
No. 470,971.   Patented Mar. 15, 1892.
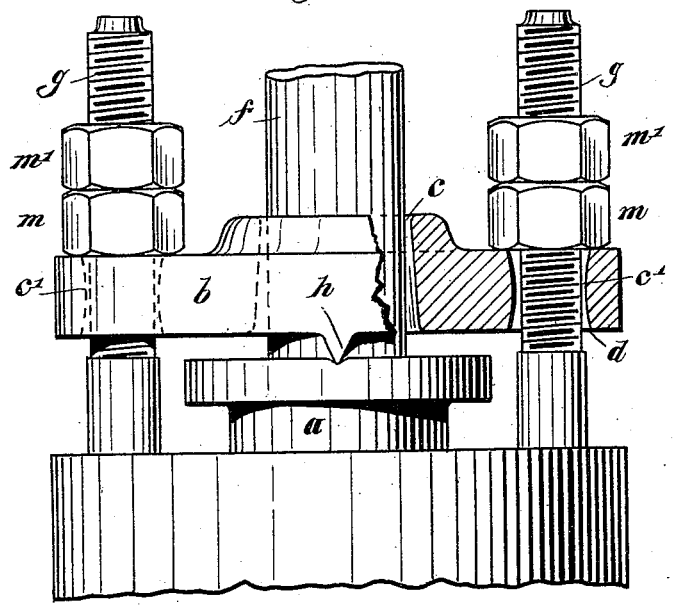
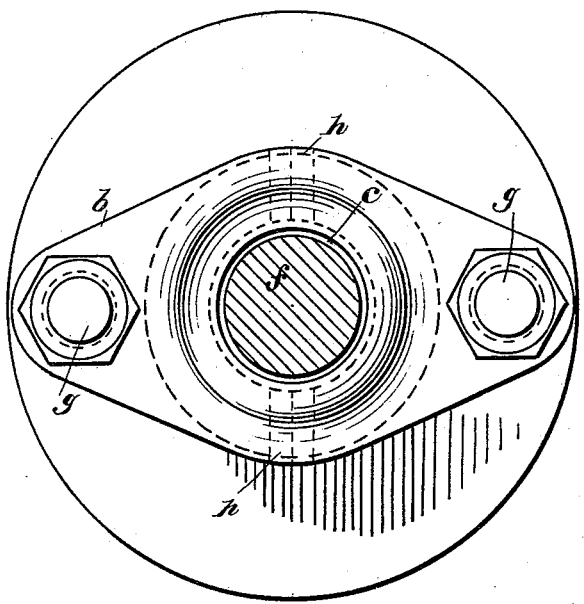
Witnesses:
H. G. Dieterich
P. W. Sommers
Inventor:
Ferdinand Bauer.
by Henry Orth
Atty.
THE NORRIS PETERS CO., PHOTO-LITHO., WASHINGTON, D. C.

UNITED STATES PATENT OFFICE.

FERDINAND BAUER, OF VIENNA, AUSTRIA-HUNGARY.

STUFFING-BOX.

SPECIFICATION forming part of Letters Patent No. 470,971, dated March 15, 1892.

Application filed April 29, 1891. Serial No. 390,968. (No model.)

*To all whom it may concern:*

Be it known that I, FERDINAND BAUER, manufacturer, a subject of the Emperor of Austria-Hungary, residing at Vienna, in the Province of Lower Austria, in the Empire of Austria-Hungary, have invented certain new and useful Improvements in Stuffing-Boxes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to the art of packing piston and other rods or other revoluble or reciprocating elements; and it consists in novel means for obtaining an invariably-uniform pressure upon the packing through the medium of the stuffing-box gland and a balanced compressing-plate.

In that class of stuffing-boxes in which the pressure upon the packing is obtained by means of adjusting bolts and nuts secured to the stuffing-box and passing through the stuffing-box gland unless such pressure is uniform at all points of the gland the latter is liable to assume a more or less inclined position relatively to the moving element passing through the same, whether such element is a revoluble or a reciprocating one, though in the case of a reciprocating element—as, for instance, a piston-rod—this liability to angular displacement is greater than in a rotary element, the result in either case being a speedy wear of the parts, an irregular function of the moving element, and leakage.

My invention has for its object to obviate this difficulty, which is effectually attained by combining with the stuffing-box gland a compressing-plate whose bearing-surface in contact with the gland is such as to be uniform and invariable whatever the position of the plate relatively to the gland, the compression being regulated by bolts and nuts, the former passing through the plate instead of the stuffing-box gland. In order to admit of angular displacement of the compressing-plate relatively to the moving element, the apertures formed in said plate both for the bolts and the moving element are of sufficiently greater diameter than said bolts and moving element. The compressing-plate is balanced on knife-edges on the stuffing-box gland, in which case the bearing-surfaces will be invariable and the pressure uniformly distributed over the gland whatever may be the position of the plate relatively to the gland.

In the accompanying drawings, Figure 1 is a side elevation of a portion of a stuffing-box, illustrating the compression-plate as balanced on knife-edge bearings. Fig. 2 is a top plan view thereof, the piston-rod being shown in section.

Similar letters indicate like parts wherever such may occur in the figures of drawings just described.

The stuffing-box and its gland and the packing may be of any approved or preferred construction, with the exception that the gland $a$ is devoid of bolt-holes, the bolts $g$, secured to the stuffing-box, extending through a compressing-plate $b$, which when but two bolts are used is preferably of ellipsoidal form, as shown in Fig. 2. The bolt-holes $d$, as well as the aperture $c$ for the passage of the piston-rod, are of greater diameter than the parts passing through the same, either by elongation or otherwise. In practice I prefer to make the rod-opening $c$ tapering outwardly, its outer smaller end being of greater diameter than that of the rod $f$, while the bolt-holes $d$ are made to taper inwardly from opposite ends, the diameter of the central smaller portion of the holes being also slightly greater either in the direction of the length of the plate or in all directions, thus providing substantially a knife-edge bearing $c'$ upon which the plate can rock. On its under side the plate $b$ is provided with knife-edge bearings $h$, arranged in an axial plane at right angles to the longitudinal axial plane of the plate, so that the latter is substantially balanced upon said knife-edges, bearings being thus formed that will not only exert a uniform pressure upon the stuffing-box gland, but that will have a fixed relation to said gland whatever may be the position of the plate relatively to the gland. It will readily be seen that whenever irregular pressure is applied to the plate by the adjustment of the nuts $m$ and jam-nuts $m'$ on bolts $g$ said plate is free to tilt in the direction of the greater pressure without thereby destroying the uniformity of the pressure or changing the direction of the pressure upon the stuffing-box gland. Of course it will be readily understood that the same results may be obtained by forming the knife-edge bearings on the gland instead of forming them on the plate $b$.

In practice I prefer to provide shallow V-shaped notches for the reception of the knife-edge bearings $h$ to prevent any displacement of the plate.

Having thus described my invention, what I claim as new therein, and desire to secure by Letters Patent, is—

The combination, with a stuffing-box and its gland, of the pressure-plate $b$, provided with knife-edges $h$, having bearing on the gland on a diametral line at right angles to the like line intersecting the adjusting-bolts, for the purpose set forth.

In testimony whereof I affix my signature in presence of two witnesses.

FERDINAND BAUER.

Witnesses:
A. SCHLESSING,
W. B. MURPHY.